US011128986B2

(12) United States Patent
Sworski et al.

(10) Patent No.: US 11,128,986 B2
(45) Date of Patent: *Sep. 21, 2021

(54) SYSTEM AND METHOD FOR TELEMATICS FOR TRACKING EQUIPMENT USAGE

(71) Applicant: Valvoline Licensing and Intellectual Property, LLC, Lexington, KY (US)

(72) Inventors: Adam E. Sworski, Catlettsburg, KY (US); Frances E. Lockwood, Georgetown, KY (US); Roger D. England, Lexington, KY (US); Timothy L. Caudill, Catlettsburg, KY (US); Jeffrey S. Baker, Lexington, KY (US); Jeffrey R. Torkelson, Lexington, KY (US)

(73) Assignee: VALVOLINE LICENSING AND INTELLECTUAL PROPERTY LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,187

(22) Filed: Feb. 19, 2020

(65) Prior Publication Data

US 2020/0196106 A1 Jun. 18, 2020

Related U.S. Application Data

(63) Continuation of application No. 16/114,503, filed on Aug. 28, 2018, now Pat. No. 10,623,905.

(51) Int. Cl.

*H04W 4/029* (2018.01)
*H04W 4/021* (2018.01)

(Continued)

(52) U.S. Cl.

CPC ........... *H04W 4/029* (2018.02); *G06Q 30/04* (2013.01); *G08G 1/205* (2013.01); *H04W 4/021* (2013.01); *G06Q 40/10* (2013.01)

(58) Field of Classification Search

CPC ....... H04W 4/029; H04W 4/021; H04W 4/44; G08G 1/205; G06Q 30/04; G06Q 40/10

(Continued)

(56) References Cited

U.S. PATENT DOCUMENTS 7,865,391 B2 1/2011 Martinez-Olague et al.
8,054,048 B2 11/2011 Woody et al.

(Continued)

OTHER PUBLICATIONS

MyOReGO, A New Way to Fund Roads for all Oregonians, launched in Jul. 2015, downloaded at http://www.myorego.org on Feb. 19, 2019 (7 pages).

(Continued)

*Primary Examiner* — Inder P Mehra

(74) *Attorney, Agent, or Firm* — Benesch, Friedlander, Coplan & Aronoff LLP

(57) ABSTRACT

Systems and methods are described for tracking information of an equipment including a telematics device configured to receive data from the equipment to determine a telematics information. The telematics information includes at least two of an equipment type, a location, a duration in the location, and miles travelled. A transmission device is configured to transmit the vehicle telematics information to at least one of a third party entity device, a government device and a mobile device.

16 Claims, 2 Drawing Sheets

117 Location Device
114 Telematics Device
115 Transmission Device
110 Sensors
116 Battery
112 Display
106 ECM
104 Engine / Motor
Equipment
102a
130
Communication Network
102b Equipment
102c Equipment
102d Equipment
102 Equipment
150 Government Entity
156 152 154
Third Party Entity
140 146 142 144
162 Processor
164 Memory
166 Browser
168 Display
170 U/I
160 Mobile Device

(51) Int. Cl.
*H04W 4/44* (2018.01)
*G06Q 30/04* (2012.01)
*G06Q 40/00* (2012.01)
*G08G 1/00* (2006.01)

(58) Field of Classification Search
USPC .......................................................... 455/437
See application file for complete search history.

(56) References Cited

U.S. PATENT DOCUMENTS 8,433,471 B2 4/2013 Christensen et al.
8,538,621 B2 9/2013 Ross et al.
8,577,528 B2 11/2013 Uyeki
8,610,401 B2 12/2013 Kim et al.
8,718,844 B2 5/2014 Krause et al.
8,941,463 B2 1/2015 Rovik et al.
9,037,507 B2 5/2015 Tate, Jr.
9,137,364 B2 9/2015 Gullapalli et al.
9,174,548 B2 11/2015 Nakagawa et al.
9,176,680 B2 11/2015 Gogoro
9,406,033 B2 8/2016 Dempski
9,796,286 B2 10/2017 Atluri et al.
9,821,677 B2 11/2017 Kim
2011/0106336 A1 5/2011 Alevo
2011/0153367 A1* 6/2011 Amigo .................. G07C 5/008 705/4
2013/0006718 A1 1/2013 Nielsen et al.
2013/0031029 A1 1/2013 Davidson
2013/0096995 A1 4/2013 Rosalik, Jr.
2014/0164196 A1 6/2014 Reddy et al.
2014/0195140 A1* 7/2014 Twarog .................. G06F 17/00 701/123
2014/0337253 A1 11/2014 Berezin et al.
2014/0354228 A1 12/2014 Williams et al.
2014/0358749 A1 12/2014 Williams et al.
2015/0140953 A1 5/2015 Bull
2015/0206356 A1 7/2015 Davidson
2015/0233718 A1 8/2015 Grokop
2015/0242969 A1* 8/2015 Pallas .................... G06Q 50/06 705/39
2016/0282514 A1* 9/2016 Moran .................... G01W 1/02
2016/0375783 A1 12/2016 Uyeki et al.
2017/0053456 A1 2/2017 Gogoro
2017/0151917 A1 6/2017 Bradley et al.
2017/0323244 A1 11/2017 Rani et al.
2017/0365169 A1* 12/2017 Tennent ............... G08G 1/0145
2018/0009325 A1 1/2018 Jang et al.
2018/0011483 A1 1/2018 Ricci et al.
2018/0137494 A1 5/2018 Matsukura
2018/0150776 A1 5/2018 Anagnos et al.
2018/0328794 A1 11/2018 Hoff
2018/0350162 A1* 12/2018 Davidson ............... G01C 21/34
2018/0357898 A1 12/2018 Kamini et al.
2019/0019362 A1* 1/2019 Gravelle .............. G07B 15/063
2019/0051179 A1* 2/2019 Alvarez ................ H04W 12/63
2019/0287162 A1* 9/2019 Ismail .................... G06Q 10/10

OTHER PUBLICATIONS

Lockwood, Bill, "Using Fleet Telematics to Reduce Fuel Tax Reporting," www.multibriefs.com, Aug. 2, 2018, 2 pages.
Shepard, Dayton, "Telematics: The Growing Trend," www.lee-smith.com, Jul. 12, 2017, 7 pages.
GEOTAB, "3 Powerful Examples of Telematics System Integration for Truck Fleets," www.geotab.com, Oct. 23, 2017, 7 pages.
Zonar, "Telematics Technology Fuels Larger Reimbursements," www.forconstructionpros.com, Oct. 7, 2014, 3 pages.
Palmer, Yukon, "Fleet GPS Tracking Systems Help Automate IFTA Fuel Tax Calculations," http://fieldlogix.com, Aug. 5, 2010, 5 pages.
Notice of Allowance dated Jan. 13, 2021 for U.S. Appl. No. 16/807,423, 86 pages.

* cited by examiner

SYSTEM AND METHOD FOR TELEMATICS FOR TRACKING EQUIPMENT USAGE

CROSS-REFERENCE TO RELATED APPLICATIONS

This patent application is a continuation application of U.S. patent application Ser. No. 16/114,503, titled "System And Method For Telematics For Tracking Equipment Usage," filed on Aug. 28, 2018, which is incorporated by reference herein in its entirety.

TECHNICAL FIELD

This disclosure generally relates to systems and methods for equipment telematics, and in some examples to equipment telematics for tracking equipment usage and controlling and/or charging the equipment, e.g., for charging taxes.

BACKGROUND

Telematics is an interdisciplinary field that can encompass telecommunications, vehicular technologies, road transportation, road safety, electrical engineering, e.g., sensors, instrumentation, wireless communications, etc., and/or computer science, e.g., multimedia, Internet, etc.

SUMMARY

According to some aspects, systems and methods provide for tracking information of an equipment including a telematics device configured to receive data from the equipment to determine a telematics information. The telematics information includes at least two of an equipment type, a location, a duration in the location, and miles travelled. The telematics device is configured to transmit the vehicle telematics information to at least one of a third party entity device, a government device and a mobile device.

Other systems, methods, features, and advantages is or will become apparent upon examination of the following figures and detailed description. It is intended that all such additional systems, methods, features, and advantages be included within this description and be protected by the accompanying claims.

DETAILED DESCRIPTION

The disclosure generally relates to systems and methods for providing a telematics system for equipment for efficiently receiving and processing information, e.g., to charge usage and/or tax the equipment. In some examples, information, including one or more of miles travelled, energy consumed, location information, type of equipment, charging details, etc., can be tracked and processed by the telematics system. In some examples, the tracked and processed information can be used to efficiently determine usage charges and/or pay road taxes and/or other usage, e.g., based on rentals, drone usage, etc., e.g., based on local, municipal, state and/or federal regulations, etc., and/or company/organization fees, etc.

Figure 1:
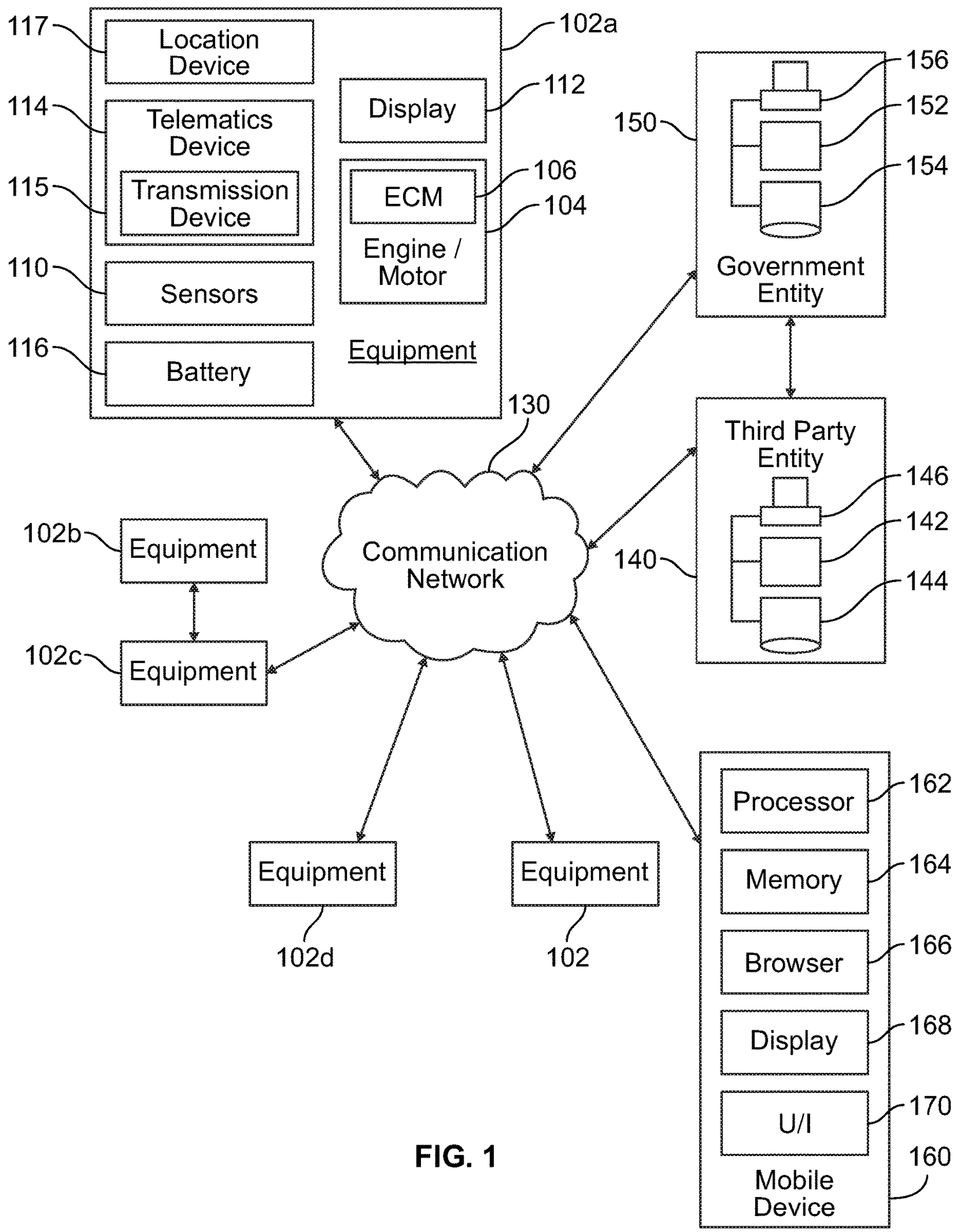
FIG. 1 is a block diagram of an example environment for tracking information related to taxing vehicle use.

FIG. 1 is a block diagram of an example environment 100 for tracking information related to equipment usage, e.g., for charging/taxing equipment 102*a-n*. Equipment examples include, but are not limited to, the transportation vehicles, (trucks, cars, buses, etc.) recreational vehicles, (ATV's, off-road vehicles, drones, boats, etc.), and/or industrial/home equipment (power generators, mining equipment, agriculture equipment, construction equipment, etc.). The equipment 102*a-n* can be driven by one or more engines and/or motors 104, e.g., internal combustion engines and/or electric motors. The equipment 102*a-n* can include an electronic control unit (ECU) 106 in communication with the engine/motor 104. The ECU 106 can send control information to the engine/motor 104 and receive feedback information from the engine/motor 104 and/or other parts of the equipment 102*a-n*. The ECU 106 can also communicate with one or more sensors 110, one or more displays 112, including audible and/or visual displays, a telematics device 114, batteries 116 and a location device 117, to name a few non-limiting examples. The location device 117 can include a global positioning system (GPS) device, including one or more of satellite-based positioning systems, cellular based positioning systems, etc. In some examples, the location device 117 is incorporated into the telematics device 114.

The telematics device 114 includes, and/or is connected with, a transmission device 115, that provides a communication link between the equipment 102*a-n* and a communication network/environment 130 and/or other equipment 102*a-n*. The communication network 130 can connect the telematics device 114 to one or more of third party entity devices 140, government entity devices 150, user devices 160, etc., Other types of communication networks/environments include, but are not limited to, vehicle to vehicle (V2V) and/or vehicle to infrastructure (V2I) communications. The communication network/environment 130 can include wireless and/or wired communication mediums, including but not limited to, cellular communications, satellite communications, WiFi, Bluetooth, Ethernet, etc. The third party entity devices 140 can include one or more servers 142, memory 144 and computers 146. The servers 142 and/or the memory 144 can be located on-site and/or located remotely from offices of the electric vehicle infrastructure companies 140, e.g., located in a remote computing environment, for example, a private or public cloud environment, e.g., AMAZON WEB SERVICES, INC. (AWS) or other cloud environment. The government entities 150 can include one or more servers 152, memory 154 and computers 156. The servers 152 and/or the memory 154 can be located on-site and/or located remotely from offices of the government entities 150, e.g., located in a remote computing environment, for example, a private or public cloud environment. The user device 160 can include one or more mobile a processor 162, a memory 164, a browser 166, a display 168 and a user interface (U/I) 170. In some examples, the user device 160 is a mobile device, including, but not limited to, smart phones, tablets, personal digital assistants, etc. In other examples, the user device 160 is a personal computer.

The telematics device 114 can collect information from one or more of the ECU 106, sensors 110, battery 116, location device 117, etc. of the equipment 102*a-n*. The collected information can include one or more of miles travelled, location, miles/time within geo-fenced area, energy usage, size of the equipment 102*a-n*, etc. Additionally or alternatively, the collected information can be processed by one or more of the telematics device 114, the third party entity device 140, government entity device 150, the mobile device 160, etc., to determine one or more of, miles travelled, location, miles/time within geo-fenced area, energy usage, size of the equipment 102*a-n*, etc. Energy usage can include one or more of, but is not limited to, hydrogen, electric, natural gas, diesel fuel, solar, gasoline, etc. In some examples, e.g., for vehicle type equipment, the miles travelled can be linked to the geo-fenced areas and reported for direct charging/taxation. In some example, the size of vehicle can be included in the determination of taxes. In some examples, taxes can include state, federal, and/or municipality taxes, or other taxes e.g., depending on the needs of organizations and/or geographic concerns.

In some examples, the telematics information to determine and report road conditions, as well as road usage statistics for use in developing applications or services. In some examples, the telematics information can include parameters recorded by the equipment 102*a-n*, including but not limited to, duty cycle information, equipment identification information, miles travelled, and miles travelled in geographic areas. In some examples, the telematics information can be sent to other applications, e.g., to help determine one or more of traffic information, weather information, etc. In some examples, a charging/taxation structure can utilize telematics data to derive charges/taxes specifically tailored to specific device types and distance utilization, e.g., accounting for differences in size and weight of the equipment 102*a-n*.

Figure 2:
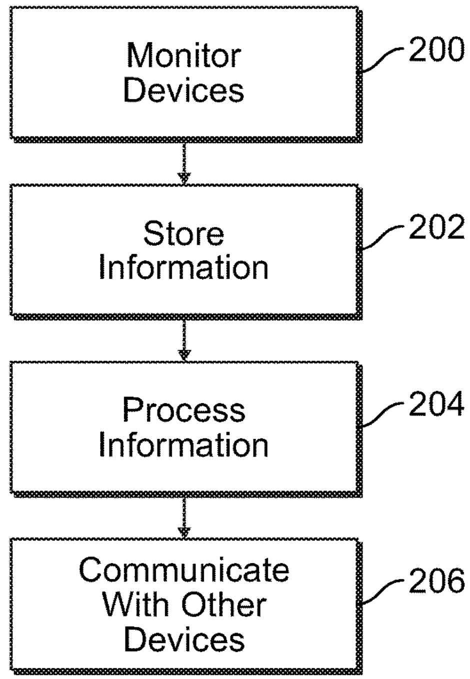
FIG. 2 is a flowchart of an example logic of the telematics device.

FIG. 2 is a flowchart of an example logic of the telematics device 114. The telematics device 114 can monitor information from one or more devices/systems of the equipment 102*a-n*, including but not limited to, the engine/motor 104, the sensors 110, the batteries 116 and the location device 117 (200). The telematics device 114 can store, at least temporarily, information related to the monitoring, including, but not limited to, miles travelled, energy consumed, location information, e.g., location when consuming energy, etc. (202). The sensors 110 can include one or more wheel sensors to determine miles travelled, battery/fuel level sensors to determine energy consumed, voltage and/or current sensors to determine charge information, etc. Information from the sensors can also be time stamped with a clock, e.g. of the telematics device 114, and/or location stamped to determine a time of location when the telematics device 114 received the information. Additionally or alternatively, distance travelled can be tracked by the location device 117, e.g., a GPS or other device. In some examples, some or all of the tracked information is not stored by the telematics device 114 but directly passed along to other devices without storing the information.

In some examples, the telematics device 114 can process the telematics information and send processed information to one or more of the third party entity device 140, the government entity device 150 and/or the mobile device 160 (204). Additionally or alternatively, the telematics device 114 sends raw data to the third party entity device 140, the government device 150 and/or the mobile device 160 to be stored by the memory 144, 154, 164 and/or processed by the servers 142, 152 or processor 162, to determine charge/tax related information for the equipment 102*a-n*. Additionally or alternatively, the memories 144, 154, 164 can store instructions which when executed by the servers 142, 152 and/or processor 162 perform some or all of the logic described herein.

In some examples, the telematics device 114, or other processor of the equipment 102*a-n*, can determine a fuel source being used by the equipment 102*a-n* within a determined geo-fenced area, e.g., based on the current telematics information indicating a location of the equipment 102*a-n*. In some examples, the ECU 106, or other control module of the equipment 102*a-n*, can restrict a use of the fuel source based on the current location of the equipment 102*a-n* within a determined geo-fenced area. For example, for a hybrid type vehicle, a state or municipality may require that only electric power can be used in certain areas, while allowing gasoline or other non-electric power in other areas. The ECU 106, or other control module of the equipment 102*a-n* can control the power source used by the equipment 102*a-n* based on information from the state or municipality. The information from the state or municipality can be stored on the equipment 102*a-n* and/or accessed by the equipment 102*a-n*, e.g., via the communication network/environment 130.

Additionally or alternatively, the telematics device 114 can send the raw or processed information to user device 160 for processing and/or display. In some examples, the telematics device 114 communicates the raw and/or processed data to one or more of the third party entity device 140, the government entity device 150, and the mobile device 160, e.g., to use the information to charge and/or determine charges/taxes, as described in more detail below (206). For example, the third party entity device 140 can determine charges/taxes based on received raw and/or processed telematics information, and send the determined charges/taxes to the government entity device 150 for charging to the owner and/or user of the equipment 102*a-n*. Additionally or alternatively, the raw and/or processed telematics information is sent directly to the government entity device 150 for processing and/or charging organizational charges/taxes.

In some examples, the telematics device 114 can associate vehicle identification information, e.g., vehicle identification number (VIN) and vehicle description, or other information to identify the equipment, e.g., serial numbers, with the monitored/determined telematics information, including, but not limited to, miles travelled, energy consumed, location of charge information, other charging details, e.g., amount of charge, etc., for sending to the third party entity 140, the government entity 150 and/or the mobile device 160, etc. The devices 140, 150, 106 can receive the vehicle identification and other information directly and/or indirectly from the telematics device 114, and associate the received information with individual owners and/or drivers of the equipment 102*a-n*. The telematics device 114 and/or the device 140, 150, 160 can associate a credit card, debit card bank account, etc. of the individual with the telematics information. The devices 140, 150, 160 can charge the individual based on the received information for charges including, but not limited to, usage charges, state and/or federal taxes, autonomous driving and/or car sharing charges, etc. In some examples, the equipment 102*a-n* can include readers for credit card chips for purpose of payment, in autonomous or other vehicles.

Figure 3:
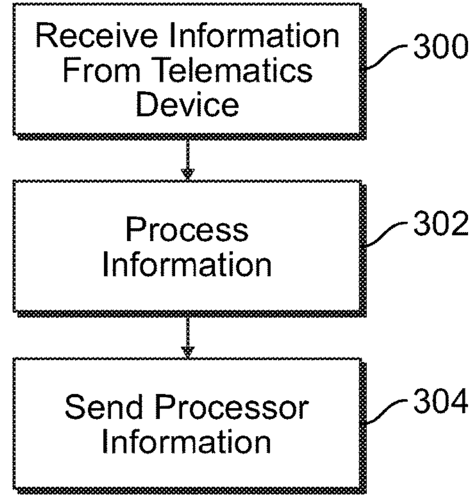
FIG. 3 is a flowchart of an example logic of the third party entity device and/or government device.

FIG. 3 is a flowchart of an example logic of the third party entity device 104, the government entity device 150 and/or the mobile device 160. The third party entity device 104, the government entity device 150 and/or the mobile device 160 can receive raw and/or processed telematics information from the telematics device 114 (300). Received information can include, but is not limited to, miles travelled, location, miles/time within geo-fenced area, energy usage, size of the equipment 102*a-n*, etc. For example, the third party entity device 104, the government entity device 150 and/or the mobile device 160 can process the received information to determine usage charges and/or taxes (302). In some examples, the vehicle telematics information further includes information on a duration that the equipment 102*a-n* spends in determined geo-fenced locations, e.g., within determined state lines, on specified highways, crossing determined bridges, etc. In this way, the telematics device 114 can eliminate a need for a user to separately track when/where the equipment 102*a-n* is being used and/or consuming energy. In some examples, federal charges can be based on time of usage or miles travelled multiplied by a multiplier based on the type of equipment 102*a-n* and/or by a factor, e.g., the federal tax rate. In some examples, state charges can be based on time of usage or miles travelled within the state and the type of equipment 102*a-n* multiplied by a multiplier based on the type of equipment 102*a-n* and/or by a factor, e.g., the state tax rate. In some examples, municipal charges can be based on time of usage or miles travelled within the municipality and the type of equipment 102*a-n* multiplied by a multiplier based on the type of equipment 102*a-n* and/or by a factor, e.g., the municipal tax rate.

The telematics device 114 to provide the processed information to the third party entity device 104, the government entity device 150 and/or the mobile device 160 (304). In some examples, the telematics device 114 sends raw telematics related data to the servers 142, 152 and/or processor 162 to process the information. The telematics device 114 can vary data sampling rates and/or compress the raw and/or processed data, e.g., including the vehicle telematics information, before storing the data and/or sending the data to the devices 140, 150, 160. In this way, the determined sampled and/or compressed data can be optimized for processing and/or storage based on determined algorithms. The determined sampled and/or compressed data can minimize cost of data transmission, e.g., to cloud storage and/or processing services, to the entity devices and/or other remote data locations. In this way, the environment 100 for tracking information related to usage and/or tax charges can automatically handle tracking and charging at the equipment level, e.g., without the need for third party applications. In some examples, the servers 142, 152 and/or processor 162 can then charge back to an account of the equipment user and/or owner for payment and other interactions.

Figure 4:
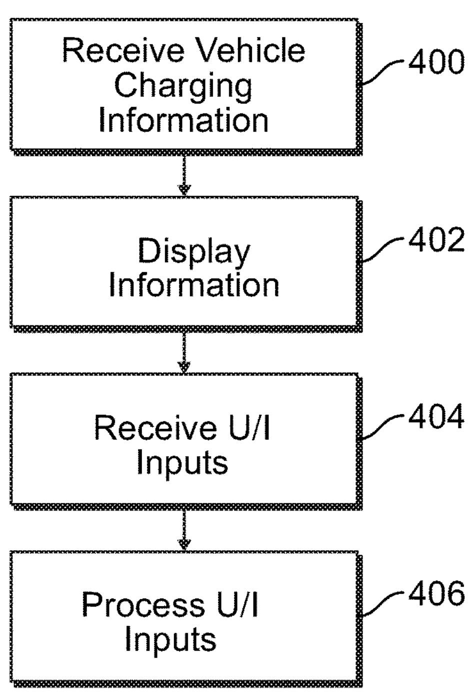
FIG. 4 is a flowchart of an example logic of the user device.

FIG. 4 is a flowchart of an example logic of the user device 160. The user device 160 can receive vehicle telematics information tracked by the telematics device 114 and/or processed by the telematics device 114, third party entity device 104, the government entity device 150 and/or the mobile device 160 (400). The user device 160 can display the information to the user, e.g., on display 168 via web browser 166 (402). In other examples, the user device 160 displays the information via a web portal or other application. The user device 160 can receive user inputs via the U/I 170 based on the displayed information (404). For example, the user device 160 can process the user inputs, e.g., to pay usage fees and/or taxes via the web browser 166 (406).

Figure 5:
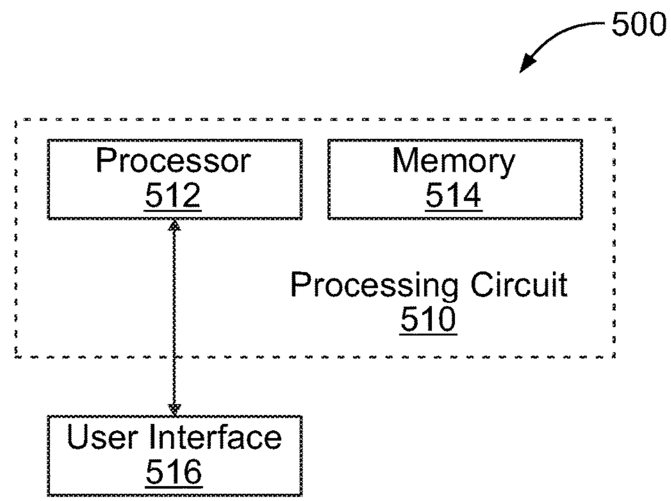
FIG. 5 is a block diagram of an example computing device.

FIG. 5 is a block diagram of an example circuitry, e.g., for one or more of the ECU 106, servers 142, 152, and/or the mobile device 160. The ECU 106, servers 142, 152, and/or the mobile device 160 can include a processing circuit 510 which includes a processor 512 to process the information tracked by the telematics device 114. The processing circuit 510 can include hardware, software and/or firmware, or any combination thereof. The hardware can include electronic components on a printed circuit board, ceramic substrate or a thin laminate substrate, etc. Software can be stored in a memory 514, e.g., erasable, programmable read only memory (EPROMs) or flash memory, so the processor 512 can be re-programmed by uploading updated code, over-the-air (OTA) updates, or replacing chips. It will be appreciated that the components, devices or elements illustrated in and described with respect to FIG. 5 may not be mandatory and thus some may be omitted in certain examples. Additionally, some examples may include further or different components, devices or elements beyond those illustrated in and described with respect to FIG. 5.

In some examples, the processing circuitry 510 is configurable to perform actions in accordance with one or more examples disclosed herein. In this regard, the processing circuitry 510 may be configured to process tracked vehicle telematics information. The processing circuitry 510 may be configured to perform data processing, application execution and/or other processing and management services according to one or more examples. In some examples, the processing circuitry 510 or a portion(s) or component(s) thereof, may include one or more chipsets and/or other components that may be provided by integrated circuits.

The processor 512 may be embodied in a variety of forms. For example, the processor 512 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 may comprise a plurality of processors. The plurality of processors may be in operative communication with each other and may be collectively configured to perform one or more functionalities of the ECU 106, servers 142, 152, fleet manager devices 120 and/or the mobile device 160 as described herein. In some examples, the processor 512 may be configured to execute instructions that may be stored in the memory 514 or that may be otherwise accessible to the processor 512. As such, whether configured by hardware or by a combination of hardware and software, the processor 512 is capable of performing operations according to various examples while configured accordingly.

In some examples, the memory 514 may include one or more memory devices. Memory 514 may include fixed and/or removable memory devices. In some examples, the memory 514 may provide a non-transitory computer-readable storage medium that may store computer program instructions that may be executed by the processor 512. In this regard, the memory 514 may be configured to store information, data, applications, instructions and/or the like for enabling the ECU 106, servers 142, 152, fleet manager devices 120 and/or the mobile device 160 to carry out various functions in accordance with one or more examples. In some examples, the memory 514 may be in communication with one or more of the processor 512, the user interface 516 for passing information among components of the ECU 106, servers 142, 152, fleet manager devices 120 and/or the mobile device 160.

It is noted that the terms "substantially" and "about" may be utilized herein to represent an inherent degree of uncertainty that can be attributed to any quantitative comparison, value, measurement, or other representation. These terms are also utilized herein to represent a degree by which a quantitative representation may vary from a stated reference without resulting in a change in the basic function of the subject matter at issue.

While particular examples above have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A system for tracking local information of an equipment on a vehicle, comprising:

a telematics device in the vehicle configured to receive at variable data sampling rate, raw data of vehicle telematics information comprising two or more of: energy usage, rate of energy consumption, equipment type, vehicle owner's information, a vehicle location, a duration of vehicle in the location, distance travelled by the vehicle, and weight and size of equipment; and a transmission device which is internally connected to the telematics device, is configured to compress the received raw data of the vehicle telematics information and directly transmit through a network, the compressed raw data of the vehicle telematics information to at least one of a third party entity device, a government device and a mobile device to determine a usage charge based on the vehicle telematics information, wherein the government device charges vehicle owner based on received vehicle telematics information, comprising: usage charges, state or federal taxes, state lines, specified highways, crossing determined bridges and car sharing charges.

2. The system of claim 1, wherein the energy usage comprises total energy consumed by one or a combination of battery electric power, hydrogen fuel, natural gas, diesel fuel, solar power and gasoline, and the rate of energy consumption comprises per unit time measurement of one or a combination of battery electric power, hydrogen fuel, natural gas, diesel fuel, solar power and gasoline.

3. The system of claim 1, wherein the vehicle comprises one of: transportation vehicles, recreation vehicles, industrial or home equipment, autonomous vehicles.

4. The system of claim 3, wherein the transportation vehicles further comprise one or a combination of: hybrid vehicles, electric powered vehicles, rental or leased vehicles, fleet managed vehicles, cars, buses, trucks, the recreation vehicles further comprise one or a combination of: all-terrain vehicles (ATV), off-road vehicle, drones, boats, and the industrial/home equipment further comprise one or a combination of: power generators, mining equipment, agriculture equipment, construction equipment.

5. The system of claim 3, wherein for autonomous self-driving vehicles, vehicle telematics information communicated to an infrastructure network communication.

6. The system of claim 1, wherein each of the telematics device, the government device and the mobile device associates with one or more of: a credit card, a debit card bank account through connection with a mobile device.

7. The system of claim 1, where the vehicle telematics information further includes information of a duration the equipment spends in determined geo-fenced locations.

8. The system of claim 7, further including an electronic control unit configured to restrict a use of a fuel source switch to an alternate fuel source based on a determined geo-fenced area.

9. A method for tracking local information of an equipment in a vehicle, comprising:

receiving by an equipment in a vehicle, compressed raw data of vehicle telematics information which are compressed, by a transmission device which is internally connected to a telematics device of the vehicle, before being transmitted from the transmission device of the vehicle, the raw data of vehicle telematics information indicates energy and equipment use in the vehicle over a period of time, wherein the raw data of vehicle telematics information are received at variable data sampling rate by the telematics device, and the raw data of vehicle telematics information includes two or more of: energy usage, rate of energy consumption, equipment type, vehicle owner's information, a vehicle location, a duration of vehicle in the location, distance travelled by the vehicle, and weight and size of equipment; and processing the raw data of the vehicle telematics information to determine a usage charge or a tax; and directly transmitting through a network, the usage charge or the tax to at least one of: a third party entity device, a government device and a mobile device to determine a usage charge based on the vehicle telematics information, wherein the one of: the third party entity device, the government device and the mobile device charges vehicle owner based on received vehicle telematics information, comprising: usage charges, state or federal taxes, state lines, specified highways, crossing determined bridges and car sharing charges.

10. The method of claim 9, wherein the energy usage comprises total energy consumed by one or a combination of battery electric power, hydrogen fuel, natural gas, diesel fuel, solar power and gasoline, and the rate of energy consumption comprises per unit time measurement of one or a combination of battery electric power, hydrogen fuel, natural gas, diesel fuel, solar power and gasoline.

11. The method of claim 9, wherein the vehicle comprises one of: transportation vehicles, recreation vehicles, industrial or home equipment, autonomous vehicles.

12. The method of claim 11, wherein the transportation vehicles further comprise one or a combination of: hybrid vehicles, electric powered vehicles, rental or leased vehicles, fleet managed vehicles, cars, buses, trucks, the recreation vehicles further comprise one or a combination of: all-terrain vehicles (ATV), off-road vehicle, drones, boats, and the industrial/home equipment further comprise one or a combination of: power generators, mining equipment, agriculture equipment, construction equipment.

13. The method of claim 11, wherein for autonomous self-driving vehicles, vehicle telematics information communicated to an infrastructure network communication.

14. The method of claim 9, wherein each of the telematics device, the government device and the mobile device associates with one or more of: a credit card, a debit card bank account through connection with a mobile device.

15. The method of claim 9, where the telematics information further includes information of a duration the equipment spends in determined geo-fenced locations.

16. The method of claim 15, further comprising restricting a use of the fuel source or switching to an alternate fuel source based on a determined geo-fenced area.

* * * * *